(12) United States Patent
Gerhardus et al.

(10) Patent No.: US 8,360,687 B2
(45) Date of Patent: Jan. 29, 2013

(54) METHOD TO LAY A PIPELINE IN CIRCLES ON THE WATER IN A HORIZONTAL PLANE

(76) Inventors: Johannes Gerhardus, Hengelo (NL); Joseph Buijvoets, Hengelo (NL)

(*) Notice: Subject to any disclaimer, the term of this patent is extended or adjusted under 35 U.S.C. 154(b) by 320 days.

(21) Appl. No.: 12/679,028

(22) PCT Filed: Sep. 24, 2008

(86) PCT No.: PCT/EP2008/008062
§ 371 (c)(1), (2), (4) Date: Mar. 19, 2010

(87) PCT Pub. No.: WO2009/040098
PCT Pub. Date: Apr. 2, 2009

(65) Prior Publication Data
US 2010/0294871 A1 Nov. 25, 2010

(30) Foreign Application Priority Data
Sep. 27, 2007 (NL) .................................. 1034437

(51) Int. Cl.
*F16L 1/12* (2006.01)
(52) U.S. Cl. .................................................. 405/168.1
(58) Field of Classification Search ............... 405/168.1, 405/168.4, 170, 171; 242/472.5
See application file for complete search history.

(56) References Cited

U.S. PATENT DOCUMENTS
5,683,204 A * 11/1997 Lawther ........................ 405/171
6,540,440 B1 * 4/2003 Beaujean .................... 405/168.1

FOREIGN PATENT DOCUMENTS
EP 0 013 324 A 7/1980
WO WO 00/11383 A 3/2000

OTHER PUBLICATIONS
International Search Report, Mar. 12, 2009, from International Phase of the instant application.

* cited by examiner

*Primary Examiner* — Sunil Singh
(74) *Attorney, Agent, or Firm* — Jackson Patent Law Office

(57) ABSTRACT

Disclosed is a method of laying pipeline in a horizontal plane. The method comprises anchoring a pivot member to a bed under a surface of a body of water; attaching a first plurality of lines to the pivot member; extruding a pipeline from a support base onto the surface of the body of water; and attaching a first line, of the first plurality of lines, to the extruded portion of the pipeline. Subsequently, the boat applies a force to the extruded portion applies such that the extruded portion of the pipeline encircles the pivot member while floating on the surface of the water, wound into a flat monolayer spiral. An inner radius of the spiral is sufficiently large to avoid applying plastic strain to the pipeline.

10 Claims, 3 Drawing Sheets

METHOD TO LAY A PIPELINE IN CIRCLES ON THE WATER IN A HORIZONTAL PLANE

BACKGROUND OF THE INVENTION

Field of the Invention

The invention relates to a method and means to prepare a pipeline, which has been welded onshore, for transport over the water to another location or for storing this pipeline, while the pipeline is floating in circles next to each other (as a large spiral) in the water.

SUMMARY OF THE INVENTION

There is a method of laying pipeline in a horizontal plane. The method comprises anchoring a pivot member to a bed under a surface of a body of water; attaching a first plurality of lines to the pivot member; extruding a pipeline from a support base onto the surface of the body of water, such that an extruded portion of the pipeline floats on the water at locations displaced from the pivot member, an end of the extruded portion defining a longitudinal axis; attaching a first line, of the first plurality of lines, to the extruded portion of the pipeline; using a boat to apply a force to the extruded portion, the force being applied in a direction non-parallel to the longitudinal axis; subsequently, attaching a second line, of the first plurality of lines, to the extruded portion of the pipeline; and subsequently, using the boat to apply a force to the extruded portion, the force being applied in a direction non-parallel to the longitudinal axis, such that the extruded portion of the pipeline encircles the pivot member while floating on the surface of the water, spirally wound into a flat monolayer spiral. An inner radius of the spiral is sufficiently large to avoid applying plastic strain to the pipeline.

DETAILED DESCRIPTION OF EMBODIMENTS OF THE INVENTION

Figure 1:
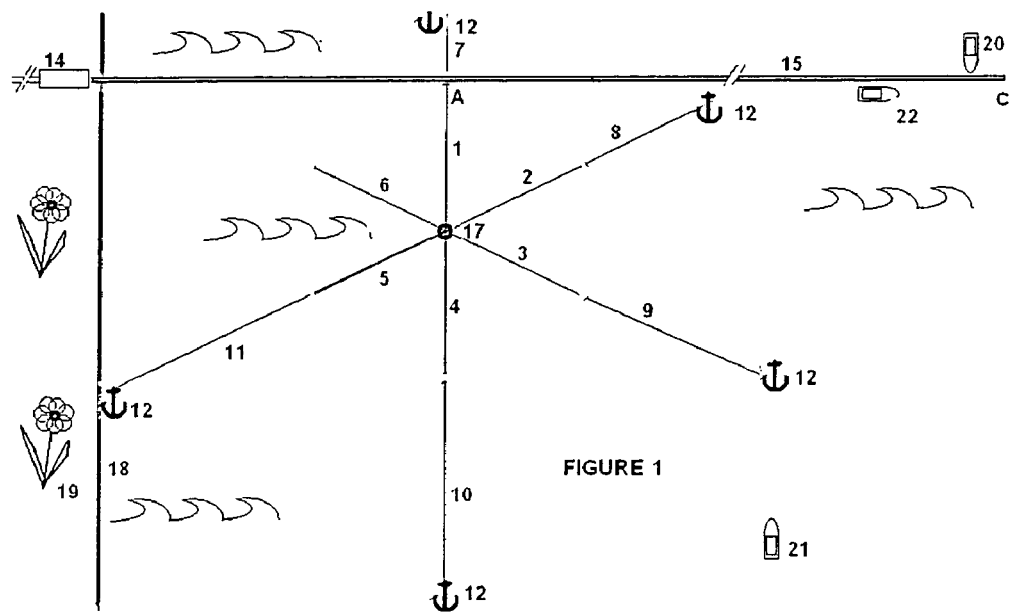
FIG. 1 is a diagram showing a stage of a pipe laying process.

The considered method only contains the part of laying the windings of the floating spiral on water and the preparations for transport and assumes that the pipeline will be supplied and fed from the onshore location towards the area where the spiral is expected to be laid. In order to control the profile of the pipeline being pushed in the water as well to prevent undue bending thereof, it has been customary to utilize control apparatus in the form of pipeline rollers and/or tensioner units.

Floating devices can be installed on the pipeline in case the pipeline will be too heavy to stay afloat by itself.

A prior example of an equal method is found in patent with registration nr WO0011388—Mar. 2, 2000 which is similar to this method with the difference, that the new method that is described here, uses centre lines to keep the pipeline spiral in an almost round form during spiralling the pipe and during transport of the pipe to a new location. An other difference is that for the first winding of the circle a complete different method is being used which has the advantage that the spiral can be made with a greater precision and a better reproducibility.

Steel pipeline is very well to bend (even when the pipeline has a concrete coating around it) when it is in its area of elastic strain. Certainly when one takes the large diameter of the floating spiral in consideration the pipe doesn't have to come under plastic strain and as a result, it will not deform permanently.

It is easy to calculate at which radius a pipeline can be bend without exceeding the boundaries of elastic strain. This will be dependent mainly on the pipe diameter, its wall thickness and the material of which the pipe is made.

One can assume that the minimum bending radius of the pipeline in the spiral shall be approximately 250 times the pipe diameter.

Lay Out of the Location

In the ideal situation the pipe will be fed from the land construction site (19) (FIG. 1) into an area with water (18) where no currents prevail.

For the method described, we assume this ideal situation but even when currents exists in the water we can use this method. However some adaptations are necessary. These adaptations will mainly exist out of some extra motorboats with sufficient motor capacity that will be used to keep the pipeline in place.

A minimal water depth of 1 meter is preferable to spiral a pipe with this method.

Broadly, the described method will circle the pipe, that will have closed ends on either side, around the a central point (17) which is about 200 to 400 meters from the waterfront. This distance is dependent on the diameter of the spiral and can be chosen each time. The closed ends must be constructed with a valve that will be closed under normal conditions This valve can be opened (by hand or remote control) to have the possibility of releasing a medium (air/water) from the pipe. This can become necessary when the pipe has to be sunk or laid on the bottom.

The pipe length that has to be spiralled can have a length of several tenths of kilometers, The diameter of the first winding should be about 500× the diameter of the pipe itself.

Following is an example: In a self-floating pipeline with outer diameter of 300 mm and a wall thickness of 8 mm, the diameter of the spiral will be 150 meters and the length of each winding almost 500 meters. Even at 20 windings is the width of the spiral band no more than 6 meters while the total length of the spiral pipeline is 10 kilometers.

The windings will eventually lay all in a flat horizontal plane next to each other.

The diameter of the windings will thus be increasing and the pipeline will spiral.

From the "central point" several centre lines (1, 2, 3, 4, 5 and 6) are attached to the pipeline when the first winding of the pipeline is being made and act during the winding-up of the pipeline as the spokes in a wheel. These centre lines must be attached to the "central point" (17) in such a way that they can move around the "central point" as spokes in a large horizontal wheel, to follow the windings in the spiral following the windup. The described method is based on 6 centre lines but also other numbers (two or more) centre lines if this will meet the expectations.

With 6 centre lines the spiral will be very rigid and will keep its roundness during spiralling and during transport.

The "central point" should be rigidly anchored to the bottom to ensure it will stay at its place during the spiralling of the pipeline.

In addition to the centre lines, five anchors (12) are placed in the outer periphery of the spiralling area on regular distance from each other. From these anchors, anchor lines (7, 8, 9, 10, 11) are available and attached to the pipeline when the first winding of the spiral is being produced to ensure that the pipeline will not deform under plastic strain during the production of the first winding by an extreme momentum that could be exercised by the motorboat (20).

As with the centre lines, other numbers of anchor lines can be used. However, it may be possible that some additional motor boats with sufficient power should be used to obtain the correct radius of the pipeline The Method The head of the pipeline (C), which is sealed with a cap so that no water in the pipeline can run inside the pipeline, will be pushed past the "central point" and the first anchor by a "tensioner" (14) in a straight line (see drawing 1), The tensioner is placed in the example on the onshore construction site (19).

If necessary, this "tensioner" can even be placed on a deck of a floating boat, barge or a pontoon in front of the waterline. The distance that the beginning of the pipeline should be pushed past the "central point" will depend on the "diameter of the first circle" ($D_{Winding}$).

While the pipeline is being pushed on the water by the tensioner a small motorboat will guide the pipeline head (C) towards its starting position as shown in FIG. 1.

In the "central point" (17) a "pivot" is strongly anchored to the bottom and has a number of centre lines attached of equal length. These centrelines will later act as spokes of a large horizontal wheel to keep the windings of the spiral in place The boat (22) shall guide the head (C) of the pipeline, and can later), if necessary, support boat (20) to bend the pipeline in the first winding of the spiral while applying only so much force on the pipeline that the pipeline will only be bent within the boundaries of elastic strain to prevent permanent deformation of the pipeline.

The distance, that the head of the pipeline (FIG. 1) is pushed in a straight line from crossing the imaginary line between the "central point" and "first anchor line" to the most far point from the coastal line will be approximately:

$$AC = \text{approximately } 2.7 \times \text{the planned diameter of the first winding}(D_{winding}).$$

When the head of the pipeline has arrived at this position (FIG. 1), the "tensioner" stops feeding the pipeline till the first winding is for about 300 degrees completed.

Before the pipeline is being bent within the boundaries of elastic strain, the first centre line (1) and the first anchor line (7) have to be attached to the pipeline (15) at point A. (FIG. 1)

At the head of the pipeline (C) a small boat (20) (if necessary with the help of another small motorboat (22) that was used for guiding the pipeline head) pushes (or pulls) the pipeline towards the direction of the end of the second centre line (2). When the diameter of the planned first winding will be sufficiently large the pipeline will bend within the boundaries of elastic strain. In case the pulling- or pushing-force will be taken away the pipeline will go back to its original form.

Figure 2:
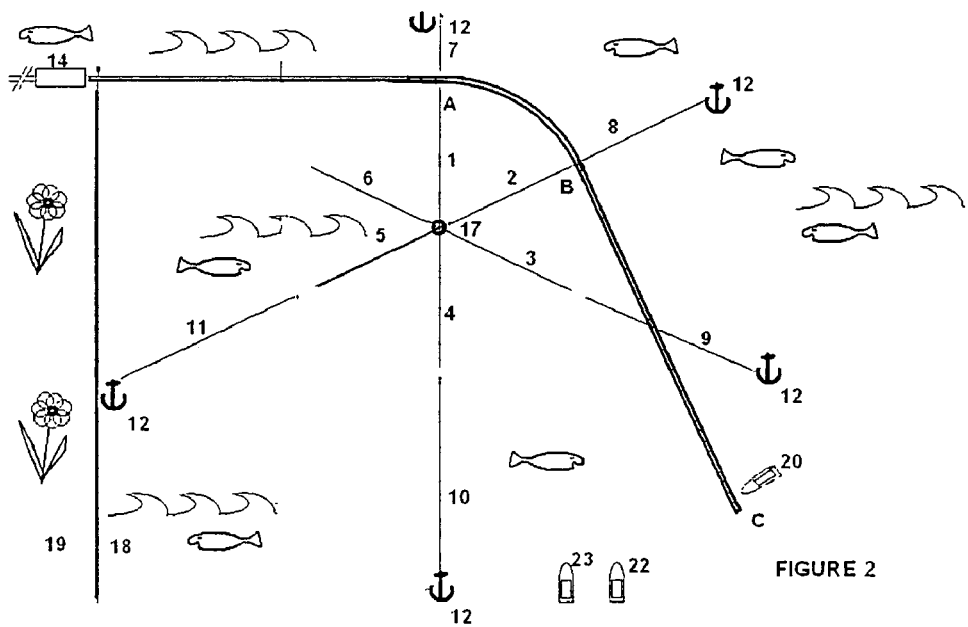
FIG. 2 is a diagram showing a pipe laying process at a stage subsequent to that shown in FIG. 1.

The small boat holds the position of the pipeline so that centre line (2) can be fixed to the pipeline at point (B) at a distance, measured along the pipeline from point (A), slightly more 0.5 $D_{winding}$. (This is roughly one sixth of the planned circumference of the first winding of the spiral) (FIG. 2)

When there are an other numbers of centrelines than 6, this will be obviously a different distance.

After the second centre line is fastened then also the second anchor line will be attached The anchor line (8) will now also be attached to the pipeline (FIG. 2) so here again a new inflection point has been made where a maximum bending momentum in the next part of spiralling the pipeline can exist.

Figure 3:
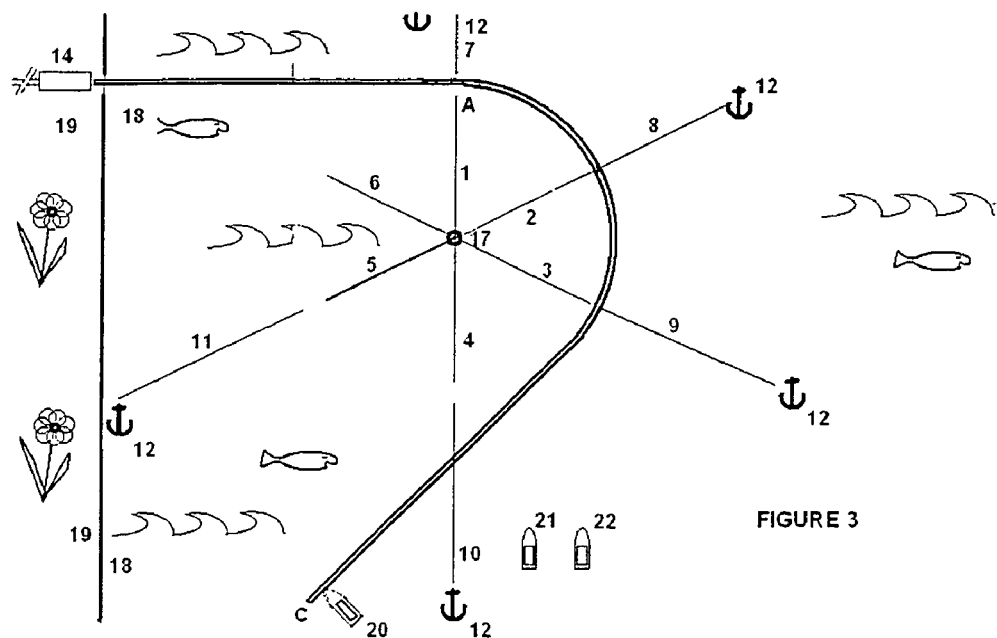
FIG. 3 is a diagram showing a pipe laying process at a stage subsequent to that shown in FIG. 2.

The boat will now slowly push (or pull) again to apply the elastic bending strain on the pipeline. When arriving at the next point where the centre line (3) and anchor line (9) come together the boat (20) will keep the pipeline in place till the third centre line (3) and third anchor line (9) are lashed to the pipeline (FIG. 3)

These events are repeated for the fourth centre line (4) and anchor line (10) and then also for the fifth centre line (5) and anchor line (11).

Figure 4:
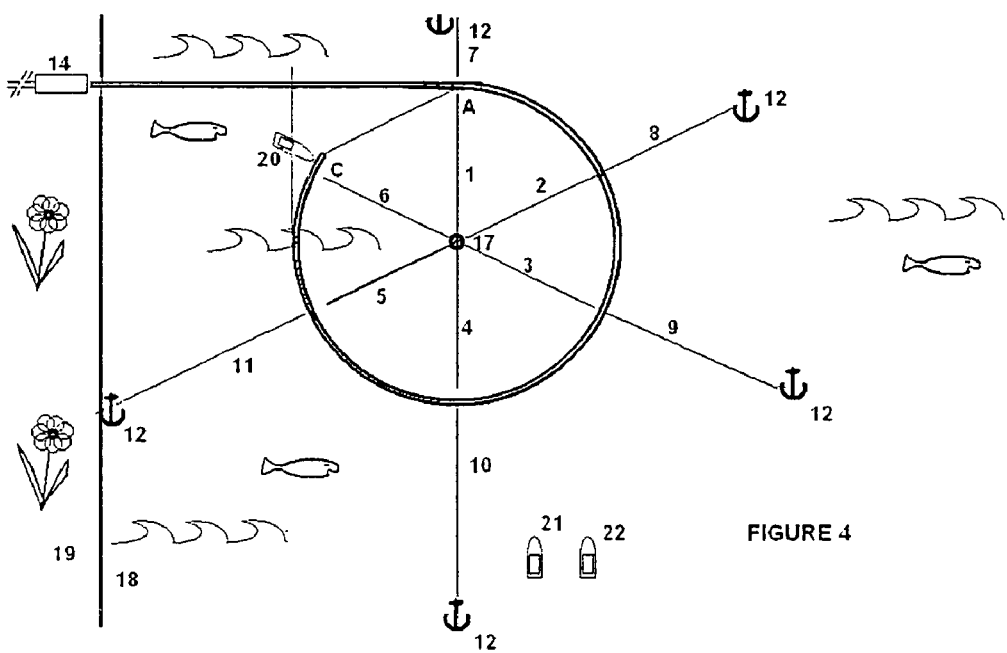
FIG. 4 is a diagram showing a pipe laying process at a stage subsequent to that shown in FIG. 3.

By continuing pushing the pipeline (15) with the boat (20) in the steps described, the last bending interval will be finalised and the pipeline must then be attached to the sixth and last centre line and also a line AC (from pipeline head (C) to the pipeline at the point where the first centre line (1) and the pipeline come together (A)) (FIG. 4).

Now, all anchor lines (7 to 11) have to be detached from the pipeline.

Figure 5:
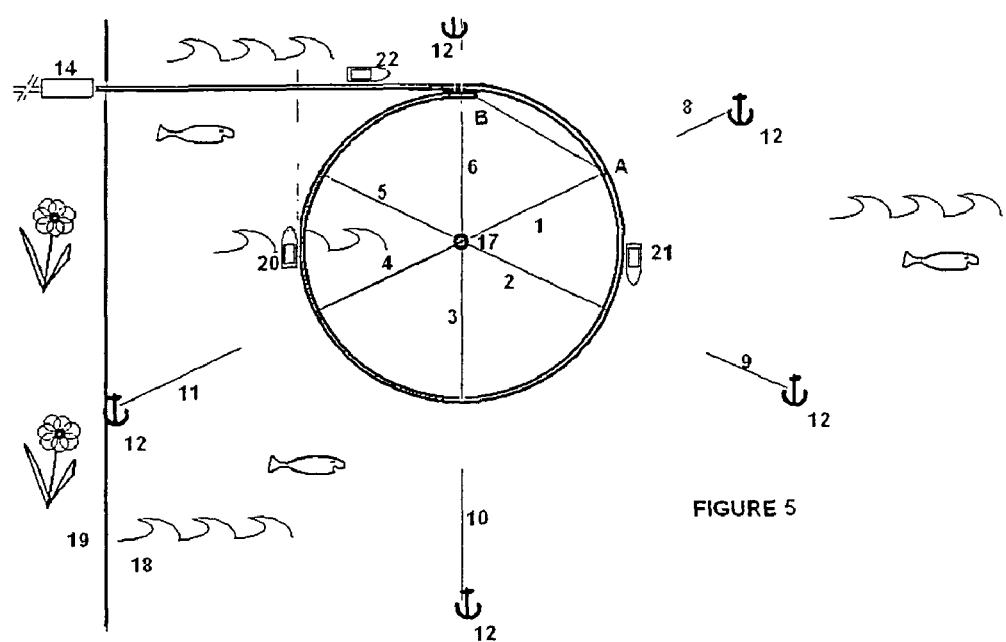
FIG. 5 is a diagram showing a pipe laying process at a stage subsequent to that shown in FIG. 4.

The "spokes" (1 t/m6) (FIG. 5) will centre the winding in its place.

The spiralling can now continue with the help of one or more boats (20, 21, 22) which alongside and attached to the first winding continue to move the pipeline.

At the same time the tensioner (14) again ensures the supply of pipeline. The boats will move with such a speed that the pipeline is not under tension except of the elastic bending strain. Depending on the situation and the strength of the tensioner it is very well possible that the boats don't have to support the movement of the pipeline's rotation around the "central point". However the crew of these boats should connect the new winding at regular intervals to the previous winding to ensure that the pipeline spiral doesn't unwind at an unexpected moment.

The boats that will help to arrange for the rotation should attach to the pipeline before the point where the pipeline starts bending (A). Then the boat has to pull and steer the pipeline into the next winding alongside the previous winding. At the same time while the boat is moving the spiral, the winding at which the boat is lashed to, should be attached to the previous winding by means of a lashing, like a nylon sling with a shackle (or other fixture). When the boat has completed 3 quarter of the winding it should unleash and go to its starting point where it must attach to the pipeline to form a new winding and repeat the procedure as described above.

The centre wheel (17) with the spokes ensures for the alignment of the windings.

In this way many windings and several kilometers of pipeline can be put on a single spiral at the waterfront for storage and/or later to be transported to another location.

At the new location the spiralled pipeline may be unwound and being placed on the bottom of the water section that has been selected for it.

In the event that the pipeline would be too heavy (ratio pipeline diameter and wall thickness is relatively small) and would sink by its own weight, floats can be used to keep the pipeline floating.

In this case the floats should then be connected to the pipeline after the pipeline passed the tensioner (14) and will be released, one by one, only when the pipeline is at the location where the pipeline should be sunk to the bottom. A special pontoon should be used in this case for sinking the pipeline down.

The method is claiming the following:

1. A method of laying pipeline in a horizontal plane, the method comprising:
    anchoring a pivot member to a bed under a surface of a body of water;
    attaching a first plurality of lines to the pivot member;
    extruding a pipeline from a support base onto the surface of the body of water, such that an extruded portion of the pipeline floats on the water at locations displaced from the pivot member, an end of the extruded portion defining a longitudinal axis;
    attaching a first line, of the first plurality of lines, to the extruded portion of the pipeline;
    using a boat to apply a force to the extruded portion, the force being applied in a direction non-parallel to the longitudinal axis;
    subsequently, attaching a second line, of the first plurality of lines, to the extruded portion of the pipeline; and
    subsequently, using the boat to apply a force to the extruded portion, the force being applied in a direction non-parallel to the longitudinal axis,
    such that the extruded portion of the pipeline encircles the pivot member while floating on the surface of the water, wound into a flat monolayer spiral, an inner radius of the spiral being sufficiently large to avoid applying plastic strain to the pipeline.

2. A method according to claim 1, further comprising closing ends of the pipeline and filling the pipeline with a substance having a specific gravity lower than the specific gravity of water or seawater, thereby providing the pipeline with buoyancy.

3. A method according to claim 1, further comprising closing ends of the pipeline;
    fitting the pipeline with a valve;
    filling the pipeline with a substance having a specific gravity lower than the specific gravity of water or seawater, thereby providing the pipeline with buoyancy, the valve enabling
    release of the substance in the pipeline.

4. A method according to claim 1, further comprising using a second plurality of lines, each having a first end and a second end, by attaching the first end of each of the second plurality of lines to a respective anchor and by attaching the second end of each of the second plurality of lines to the pipeline, such that the pipeline is between the second plurality of lines and the first plurality of lines.

5. A method according to claim 1, wherein the pipeline will not reach the area of plastic strain and therefore the pipeline will not deform permanently.

6. A method according to claim 1, further comprising fitting the pipeline with floatation devices to keep the pipeline buoyant.

7. A method according to claim 1, further comprising dragging the spirally wound.

8. A method according to claim 1, wherein the method is performed in a water depth of less than 1 meter.

9. A method according to claim 1 further comprising
    closing ends of the pipeline;
    fitting the pipeline with a valve;
    filling the pipeline with a substance of which the specific gravity is lower than the specific gravity of water or seawater, thereby providing the pipeline with buoyancy, the valve enabling changing of a pressure inside the pipeline.

10. A method according to claim 1 wherein the support base is on land.

* * * * *

UNITED STATES PATENT AND TRADEMARK OFFICE
CERTIFICATE OF CORRECTION

PATENT NO. : 8,360,687 B2  
APPLICATION NO. : 12/679028  
DATED : January 29, 2013  
INVENTOR(S) : Buijvoets Page 1 of 1

It is certified that error appears in the above-identified patent and that said Letters Patent is hereby corrected as shown below:

Title Page, Item (12) "Gerhardus et al." should be corrected to read
-- Buijvoets --

Title Page, below Item (54)

"(76) Inventors: Johannes Gerhardus, Hengelo (NL);
Joseph Buijvoets, Hengelo (NL)"

is corrected to read

-- (76) Inventor: Johannes Gerhardus Joseph Buijvoets, Hengelo (NL) --

Signed and Sealed this
Nineteenth Day of August, 2014

Michelle K. Lee
*Deputy Director of the United States Patent and Trademark Office*